Patented May 29, 1934

1,960,347

UNITED STATES PATENT OFFICE 1,960,347

PROCESS OF PREPARING PURE HYDROGEN FLUORIDE

Philipp Osswald, Hofheim-on-Taunus, and Otto Scherer, Frankfort-on-the-Main-Hochst, Germany, assignors to I. G. Farbenindustrie Aktiengesellschaft, Frankfort-on-the-Main, Germany No Drawing. Application August 24, 1932, Serial No. 630,242. In Germany September 2, 1931

2 Claims. (Cl. 23—153)

The present invention relates to a process of preparing pure hydrogen fluoride.

We have found that hydrogen fluoride is very readily soluble in cold sulfuric acid and that nearly all hydrogen fluoride can be expelled from this solution at a temperature at which neither the water vapors nor the sulfur trioxide distils from the acid. Furthermore, silicon fluoride which in most cases is present in the crude hydrogen fluoride is not dissolved by cold concentrated sulfuric acid: pure hydrogen fluoride can, therefore, be obtained in a very simple manner by taking advantage of these facts. For this purpose the crude vapors of hydrogen fluoride produced for instance in known manner from fluor spar and sulfuric acid are conducted through concentrated sulfuric acid. In case the crude vapors of hydrogen fluoride contain water vapor, a quantity of sulfuric anhydride which is approximately equivalent to the water vapor is added to the absorption liquid. The absorption vessel is cooled with water in order to absorb the amount of heat evolved. Silicon fluoride and sulfur dioxide contained in the crude hydrogen fluoride are not absorbed by the sulfuric acid.

The sulfuric acid containing the hydrogen fluoride is heated preferably in another vessel to a temperature between 60° C. and 100° C. During this operation completely dry and pure hydrogen fluoride is expelled. By regulating the temperature in an appropriate manner or by slowly introducing the solution of hydrogen fluoride in sulfuric acid into the separating vessel, it is easily possible to obtain a uniform current of pure hydrogen fluoride. Since storing hydrogen fluoride in a pure condition involves difficulty on account of the low boiling point of the fluoride, it is advisable to store this substance in the form of its solution in sulfuric acid and to expel it by heat when desired.

Moreover the process can readily be utilized in separating hydrogen fluoride from a gaseous mixture such as is produced for example in fluorinating processes. The hydrogen fluoride is dissolved from the gaseous mixture by means of cold sulfuric acid and can then be recovered, as above described, from its sulfuric acid solution.

The following examples serve to illustrate our invention, but they are not intended to limit it thereto, the parts being by weight:

1. From a mixture of fluor spar and sulfuric acid there is expelled hydrogen fluoride containing 80 per cent by weight of HF, 10 per cent. by weight of $SiF_4$, 5 per cent. of $H_2O$ and 5 per cent. of $SO_2$. The gases are conducted through sulfuric acid of 100 per cent. strength which is cooled so that its temperature does not rise about 30° C. For 1 part of hydrogen fluoride to be absorbed 1 part of sulfuric acid is applied, so that a solution of 50 per cent. strength is obtained. $SO_2$ and $SiF_4$ remain undissolved and pass away. The solution is then heated to about 60° C. to 80° C., whereby 80 per cent. of the hydrogen fluoride is obtained in a concentration of 99–100 per cent. The sulfuric acid containing the rest of the HF can be used for instance for producing crude hydrogen fluoride from fluor spar. Thus the total amount of HF introduced into the process can be utilized.

2. The gases which are expelled during the fluorination of organic substances with anhydrous hydrogen fluoride contain hydrogen chloride and some free hydrogen fluoride and organic fluorine compounds. The gases are conducted through cold sulfuric acid whereby hydrogen fluoride is dissolved. The solution is either treated as described in Example 1 directly by heating it or, in case it is too weak, it is first charged completely with crude hydrogen fluoride and then worked up by heating it.

3. A gas consisting of 70 parts of HF, 12 parts of $SiF_4$, 10 parts of $H_2O$ and 8 per cent. of $SO_2$ is conducted through a mixture of fuming sulfuric acid consisting of 43 parts of $H_2SO_4$ and 22 parts of $SO_3$. A mixture containing 50 per cent. of HF is obtained and is worked up as described in Example 1.

We claim:

1. In the process of preparing pure hydrogen fluoride the steps which comprise dissolving the vapors of crude hydrogen fluoride in cold sulfuric acid and expelling the hydrogen fluoride from the solution by heating it to about 60° C. to 100° C.

2. In the process of preparing pure hydrogen fluoride according to claim 1 the further step which comprises adding to the cold sulfuric acid a quantity of sulfuric anhydride which is approximately equivalent to the water vapor of the crude hydrogen fluoride.

PHILIPP OSSWALD.
OTTO SCHERER.